United States Patent
Abe et al.

(10) Patent No.: US 7,522,363 B2
(45) Date of Patent: Apr. 21, 2009

(54) MEDIUM STORAGE DEVICE AND MEDIUM ROTATION SYNCHRONIZATION PROCESSING METHOD FOR MEDIUM STORAGE DEVICE

(75) Inventors: Takao Abe, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 11/182,481

(22) Filed: Jul. 15, 2005

(65) Prior Publication Data

US 2006/0203369 A1 Sep. 14, 2006

(30) Foreign Application Priority Data

Mar. 14, 2005 (JP) ............................. 2005-071427

(51) Int. Cl.
 *G11B 5/09* (2006.01)
(52) U.S. Cl. ........................ 360/51; 360/48; 360/53
(58) Field of Classification Search .................. 360/31, 360/51, 48, 53
 See application file for complete search history.

(56) References Cited

U.S. PATENT DOCUMENTS

| | | | | |
|---|---|---|---|---|
| 5,680,267 A * | 10/1997 | Tanaka et al. | ................. | 360/51 |
| 5,768,234 A * | 6/1998 | Satomura | .................. | 369/59.19 |
| 6,009,549 A * | 12/1999 | Bliss et al. | .................. | 714/769 |
| 6,014,276 A * | 1/2000 | Takase | ........................ | 360/49 |
| 6,023,386 A * | 2/2000 | Reed et al. | .................... | 360/51 |
| 6,069,667 A * | 5/2000 | Ueda et al. | .................. | 348/525 |
| 6,483,789 B1 * | 11/2002 | Kubota et al. | ............ | 369/53.16 |
| 6,580,573 B1 * | 6/2003 | Hull et al. | ...................... | 360/46 |
| 6,603,622 B1 * | 8/2003 | Christiansen et al. | ......... | 360/66 |
| 6,816,328 B2 * | 11/2004 | Rae | ............................. | 360/51 |
| 6,882,487 B2 * | 4/2005 | Hanson et al. | ................ | 360/51 |
| 6,928,038 B2 * | 8/2005 | Tsai et al. | ................ | 369/47.28 |
| 6,967,799 B1 * | 11/2005 | Lee | ............................. | 360/51 |
| 7,023,639 B1 * | 4/2006 | Kupferman | .................. | 360/51 |
| 7,068,459 B1 * | 6/2006 | Cloke et al. | ................... | 360/51 |
| 7,075,742 B2 * | 7/2006 | Ehrlich | ........................ | 360/29 |
| 7,088,534 B2 * | 8/2006 | Sutardja | ...................... | 360/51 |
| 7,126,776 B1 * | 10/2006 | Warren et al. | ................. | 360/51 |
| 7,136,242 B1 * | 11/2006 | Chue et al. | .................... | 360/51 |
| 7,212,364 B1 * | 5/2007 | Lee | ............................. | 360/51 |
| 2004/0131135 A1 * | 7/2004 | Kojima et al. | ............... | 375/368 |

(Continued)

FOREIGN PATENT DOCUMENTS

JP 06-325366 11/1994

(Continued)

*Primary Examiner*—Hoa T Nguyen
*Assistant Examiner*—Dismery E Mercedes
(74) *Attorney, Agent, or Firm*—Greer, Burns & Crain, Ltd.

(57) ABSTRACT

A medium storage device writes or read data on a storage medium synchronizing the rotation of the storage medium with the DSW method for decreasing the gap length considering the rotation jitter. The medium storage device has a controller for generating synchronization timing signals during reading/writing from a clock, and a processing unit for calculating the correction value of the frequency from the measurement result of the servo synchronization mark space of the storage medium. The processing unit judges whether the servo synchronization mark has been correctly detected and calculates the frequency correction value. Therefore changing the synchronization timing using the SSM interval detected in error can be prevented, and the danger of data corruption can be avoided.

18 Claims, 14 Drawing Sheets

U.S. PATENT DOCUMENTS

| | | |
|---|---|---|
| 2005/0024759 A1* | 2/2005 | Sakai et al. .................... 360/48 |
| 2006/0056555 A1* | 3/2006 | Oono et al. .................. 375/354 |
| 2007/0103805 A1* | 5/2007 | Hayashi et al. ............... 360/39 |

FOREIGN PATENT DOCUMENTS

| | | |
|---|---|---|
| JP | 11-031358 | 2/1999 |
| JP | 11-134796 | 5/1999 |
| JP | 11-176093 | 7/1999 |
| JP | 2002-133771 | 5/2002 |
| JP | 2003-091940 | 3/2003 |

* cited by examiner

Servo Area 100

WRITE START "0" AND WRITE END "9" ARE LINKED AT
WRITE END "9" SINCE A CLOCK ERROR IS ACCUMULATED
AFTER WRITE START. THE WRITE LINK VALUE IS MORE OR LESS
OF AN IDEAL VALUE.

MEDIUM STORAGE DEVICE AND MEDIUM ROTATION SYNCHRONIZATION PROCESSING METHOD FOR MEDIUM STORAGE DEVICE

CROSS-REFERENCE TO RELATED APPLICATIONS

This application is based upon and claims the benefit of priority from the prior Japanese Patent Application No. 2005-071427, filed on Mar. 14, 2005, the entire contents of which are incorporated herein by reference.

BACKGROUND OF THE INVENTION

1. Field of the Invention

The present invention relates to a medium storage device for recording data on a medium by a head and a medium rotation synchronization processing method, and more particularly to a medium storage device for decreasing the rotation jitter gap which is created anticipating the rotation jitter of a medium, and a medium rotation synchronization processing method.

2. Description of the Related Art

Because of the recent demands for the computerized processing of data, larger capacities are demanded for medium storage devices for storing the data, such as magnetic disk devices and optical disk devices. For this, the track density and recording density of a disk medium are increasing more and more. Also a decrease in unnecessary areas on tracks is demanded.

In the format of one track on the disk shown in FIG. 13, the data area 102 is created immediately after the servo area 100, and the servo area 100 is created for acquiring positioning information and for recognizing the start of the data areas. For example 10 pairs of the servo area 100 and the data area 102 continue on one track.

FIG. 13 shows the time axes of the rotation of the disk. If there is no rotation jitter and no eccentricity of the disk, then the space of the servo area 100 or the data area 102 becomes the same value "A", as shown at the top in FIG. 13. If a rotation jitter and eccentricity of the disk exists, as shown at the bottom in FIG. 13, then the space of the servo area 100 or the data area 102 becomes "A1", "A2" and "A3", which are not constant values. Therefore when the read/write operation is controlled based on the time from the servo area 100, then all the data areas cannot be used since the data areas are not constant.

Therefore as FIG. 14 shows, a gap area 104 is created before and after the data area 102, and a preamble area 106 is created before the data area 102 to absorb this fluctuation. In other words, as the top in FIG. 14 shows, when the servo mark in the servo area 100 is detected (SSM found), a sector pulse of each data area 102 and read gate (same for write gate) are generated. By this, as the bottom in FIG. 14 shows, the read gate can cover at least the data area 102 even if a rotation jitter and eccentricity occur (e.g. Japanese Patent Application Laid-Open No. H11-031358).

This method is for generating a read gate by counting the clocks with a fixed frequency from the detection of the servo mark. Therefore as FIG. 14 shows, the servo gate and the read gate (same for write gate) do not completely match with the data area 102, and are shifted from the data area 102. For this, a specific length of the gap area 104 is required so that the shift causes no problems. This length is determined at designing anticipating the maximum eccentricity of the disk and the maximum rotation change value of the disk, which are expected.

Another prior method, as shown in FIG. 15, is proposed that calculates the frequency correction value by measuring this servo interval, and controls the start position (timing) of the read gate/write gate/servo gate, so that the synchronization relationship of the read gate and the data area is maintained even if an eccentricity of the disk and rotation fluctuation exist (e.g. Japanese Patent Application Laid-Open NO. 2002-133771). This method is called the DSW (Disk Synchronous Write) method.

Because of the recent demands for downsizing devices, such disk storage devices are also installed in compact servers and mobile equipment (e.g. notebook type personal computer and portable AV (Audio/Visual) equipment). Therefore such disk devices are used in environments which easily subject to the influence of the external environment, such as vibration and temperature change. This makes it possible to detect the servo synchronization mark in error.

So in the case of a conventional method for controlling (the changing clock frequency of) a read gate and write gate based on the measurement of the interval of servo synchronization marks, the DSW method cannot be used effectively if a servo synchronization mark is detected in error, where data corruption may occur.

Also the interval measurement error of servo synchronization marks may occur, so the DSW method cannot be used effectively, where data corruption may occur, and the data reliability of the disk storage device drops.

SUMMARY OF THE INVENTION

With the foregoing in view, it is an object of the present invention to provide a medium storage device for detecting the error detection of a servo synchronization mark so as to use the DSW method effectively, and a medium rotation synchronization processing method for the medium storage device.

It is another object of the present invention to provide a medium storage device for judging that the servo synchronization marks were correctly detected and applying the DSW method effectively using the interval of the servo synchronization marks, and a medium rotation synchronization processing method for the medium storage device.

It is still another object of the present invention to provide a medium storage device for absorbing the measurement dispersion of the interval of the servo synchronization marks so as to apply the DSW method effectively, and a medium rotation synchronization processing method for the medium storage device.

It is still another object of the present invention to provide a medium storage device for effectively applying the DSW method even if a servo synchronization mark was not detected for any reason, and a medium rotation synchronization processing method for the medium storage device.

To achieve these objects, the medium storage device of the present invention has a head for either reading or writing data on a track of a storage medium where servo information, including servo synchronization marks, is written on one track with a predetermined interval, an actuator for positioning the head onto a desired track of the storage medium which is rotating, a controller for controlling reading or writing data on the storage medium by the head at a timing synchronizing the rotation of the storage medium, and a processing unit for correcting the synchronization timing of the controller from the interval of the servo synchronization marks detected by the controller. And the processing unit judges the normalcy of the detection of the servo synchronization marks, and corrects the synchronization timing of the controller based on the interval of the servo synchronization marks when the judgment result is normal.

The medium rotation synchronization processing method of the present invention has a step of reading data on a track of a storage medium where servo information, including servo synchronization marks, is written on one track with a predetermined interval, a step of writing or reading data on the storage medium by the head at a timing synchronizing the rotation of the storage medium, a step of judging the normalcy of the detection of the servo synchronization marks detected from a read signal of the head, and a step of correcting the synchronization timing based on the interval of the servo synchronization marks when the judgment result is normal.

In the present invention, it is preferable that the processing unit judges the normalcy of the detection of the servo synchronization mark based on the servo information other than the servo synchronization mark which comes after the servo synchronization mark.

In the present invention, it is also preferable that, if the judgment is normal, the processing unit performs low pass filter processing for the interval of the servo synchronization marks and corrects the synchronization timing of the controller based on the interval of the servo synchronization marks of the processing result.

In the present invention, it is also preferable that, if the judgment result is not normal, the processing unit calculates the interval of the servo synchronization marks which is estimated by interpolation processing of the interval of the servo synchronization marks in the past, and corrects the synchronization timing of the controller based on the estimated interval of the servo synchronization marks.

In the present invention, it is also preferable that the controller further has a clock source for generating clocks, and a timing generation circuit for generating the rotation synchronization timing signals from the clock, and the processing unit calculates a frequency correction value of the clock of the timing generation circuit, and sets the calculated value in the controller.

In the present invention, it is also preferable that the processing unit starts the synchronization timing correction processing according to a servo gate signal synchronizing the rotation of the storage medium.

In the present invention, it is also preferable that the controller further has a counter for counting the servo synchronization mark detection time based on the clock of the clock source, and the processing unit reads a count value of the counter according to a servo gate signal synchronizing the rotation of the storage medium, and executes the synchronization timing correction processing.

In the present invention, it is also preferable that the timing generation circuit of the controller has a servo timing generation circuit for generating a servo timing signal from the clock, a data timing generation circuit for generating a data timing signal from the clock, and a write timing generation circuit for generating a write timing signal from the clock.

In the present invention, it is also preferable that the controller further has a gate signal generation circuit for generating a servo gate signal, read gate signal and write gate signal according to the servo timing signal of the servo timing generation circuit.

In the present invention, it is also preferable that the controller further has a detection circuit for outputting the servo information and the read data from a read signal of the head according to the servo timing signal and the data timing signal.

According to the present invention, when a frequency correction value is calculated from the measurement result of the interval of the servo synchronization marks of the rotating storage medium, it is judged whether the servo synchronization marks were correctly detected, so changing the synchronization timing using the SSM (Servo Synchronization Mark) interval detected in error can be prevented, and the danger of data corruption can be avoided.

BRIEF DESCRIPTION OF THE DRAWGINS

DESCRIPTION OF THE PREFERRED EMBODIMENTS

Embodiments of the present invention will now be described in the sequence of the medium storage device, frequency correction circuit, frequency correction processing, frequency correction limitation processing and other embodiments.

Medium Storage Device

Figure 1:
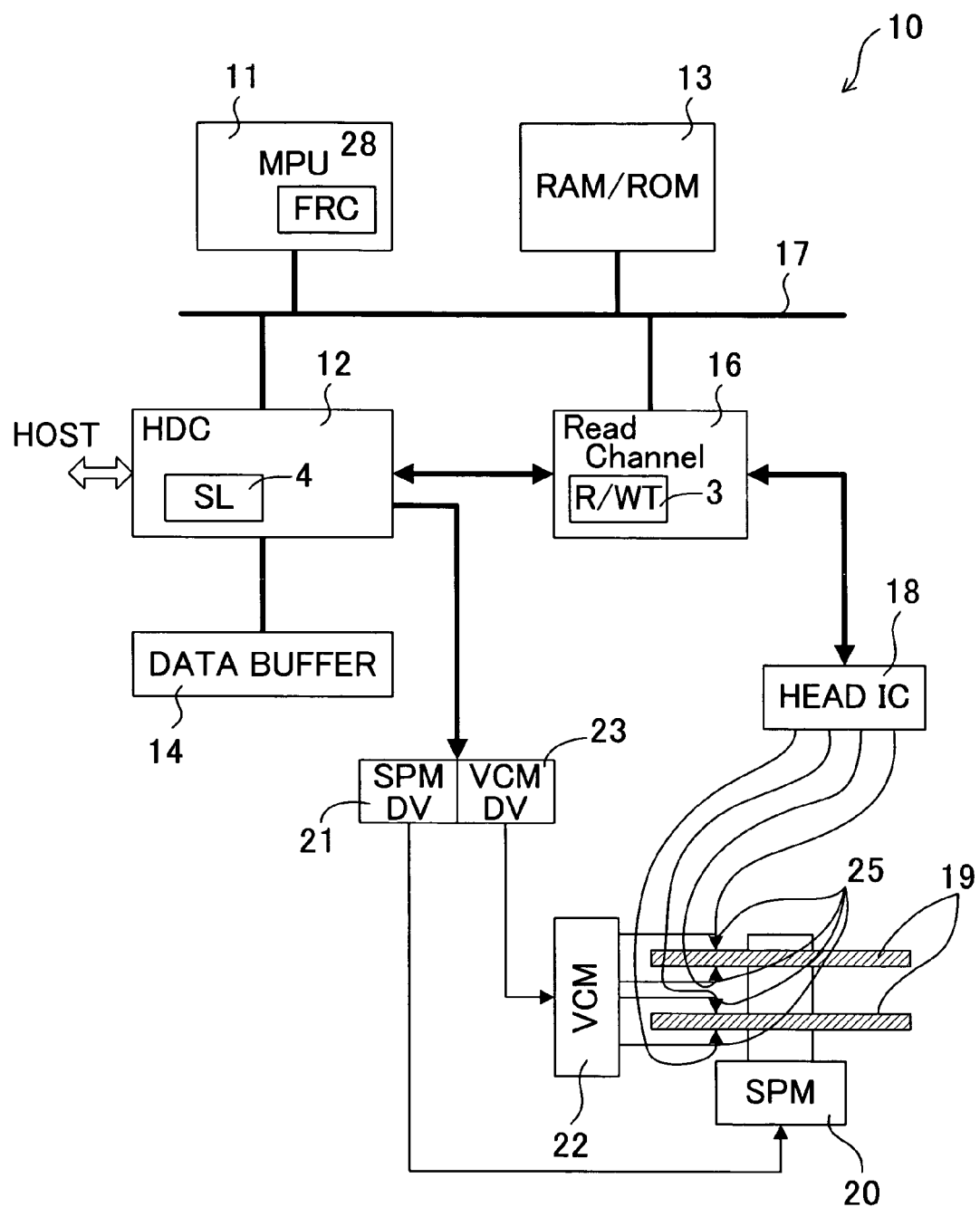
FIG. 1 is a block diagram depicting the medium storage device according to an embodiment of the present invention.
Figure 2:
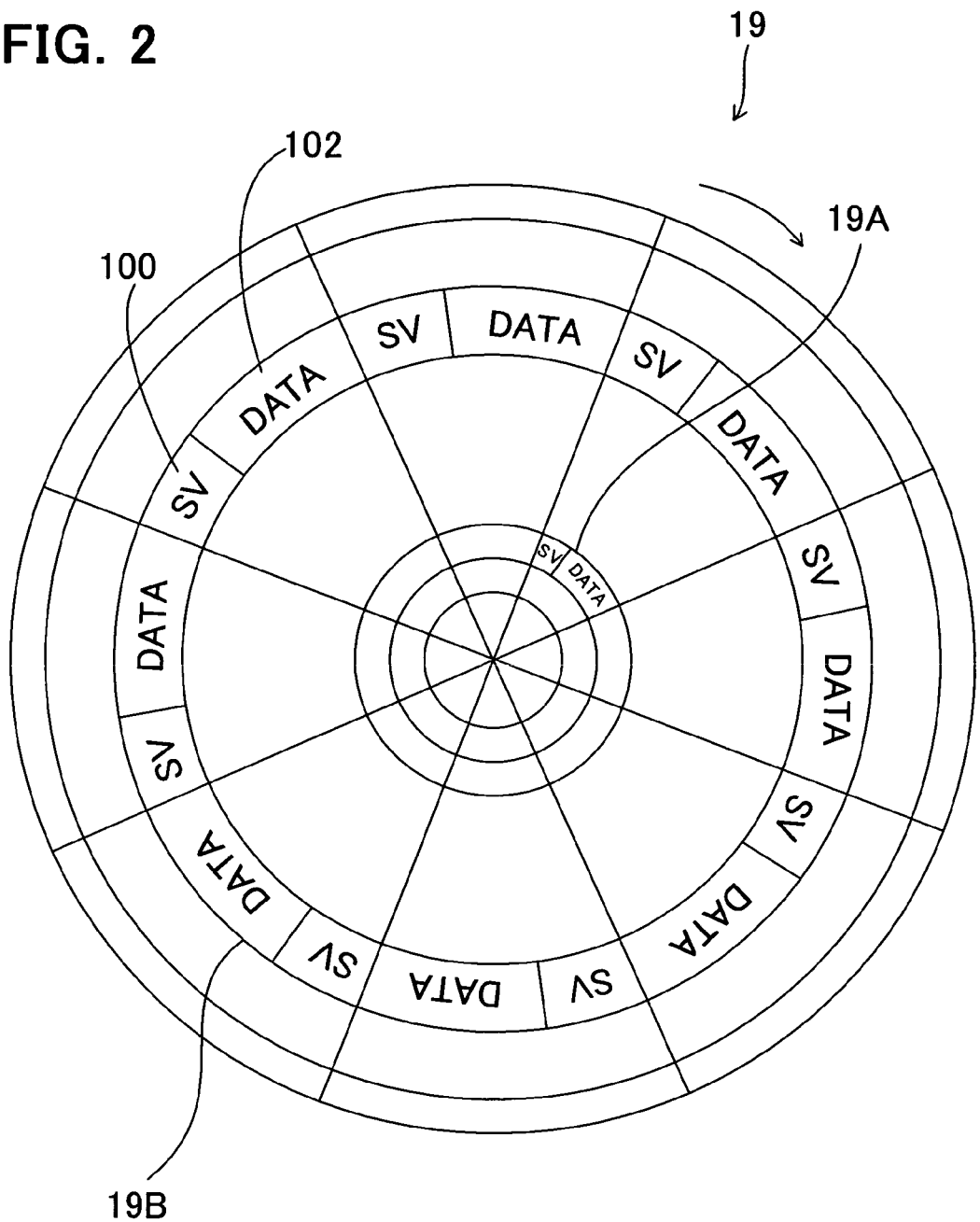
FIG. 2 is a diagram depicting the servo information and data area on the disk in FIG. 1.

FIG. 1 is a block diagram depicting the medium storage device according to an embodiment of the present invention, and FIG. 2 is a diagram depicting the servo area and the data area on the medium in FIG. 1. FIG. 1 shows the magnetic medium device (Hard Disk Drive) for reading/writing data on the magnetic medium as an example of the medium storage device.

As FIG. 1 shows, the magnetic disk device 10 is built into a personal computer, and is connected with the host (not illustrated) of the personal computer via an ATA (AT Attachment) standard interface cable (not illustrated), for example.

The magnetic disk device 10 is comprised of a magnetic disk 19, a spindle motor 20 for rotating the magnetic disk 19, a magnetic head 25 for reading/writing data on the magnetic disk 19, and an actuator (VCM) 22 for moving the magnetic head 25 in a radius direction (track crossing direction) of the magnetic disk 19.

The control unit is comprised of an HDC (Hard Disk Controller) 12, a data buffer 14, an MPU 11, a memory (RAM) 13, a read channel 16, a head IC 18, a spindle motor driver 21, a VCM driver 23, and a bus 17 connecting these composing elements.

The HDC 12 has an interface control circuit which has a task file for setting a task from the host, and a data buffer control circuit for controlling the data buffer 14. The read channel control circuit 16 demodulates the read data and generates a write gate.

The data buffer 14 plays a role of the cache memory, and stores the write data from the host and stores the read data from the magnetic disk 19. During write back the write data of the data buffer 14 is written on the magnetic disk 19, and during reading the read data in the data buffer 14 is transferred to the host.

The head IC 18 supplies recording current to the magnetic head 25 according to the write data during write, amplifies the read signal from the magnetic head 25, and outputs it to the read channel circuit 16 during read. The spindle motor driver 21 rotary-drives the spindle motor 20. The VCM driver 23 drives the VCM 22 for moving the magnetic head 25.

Figure 5:
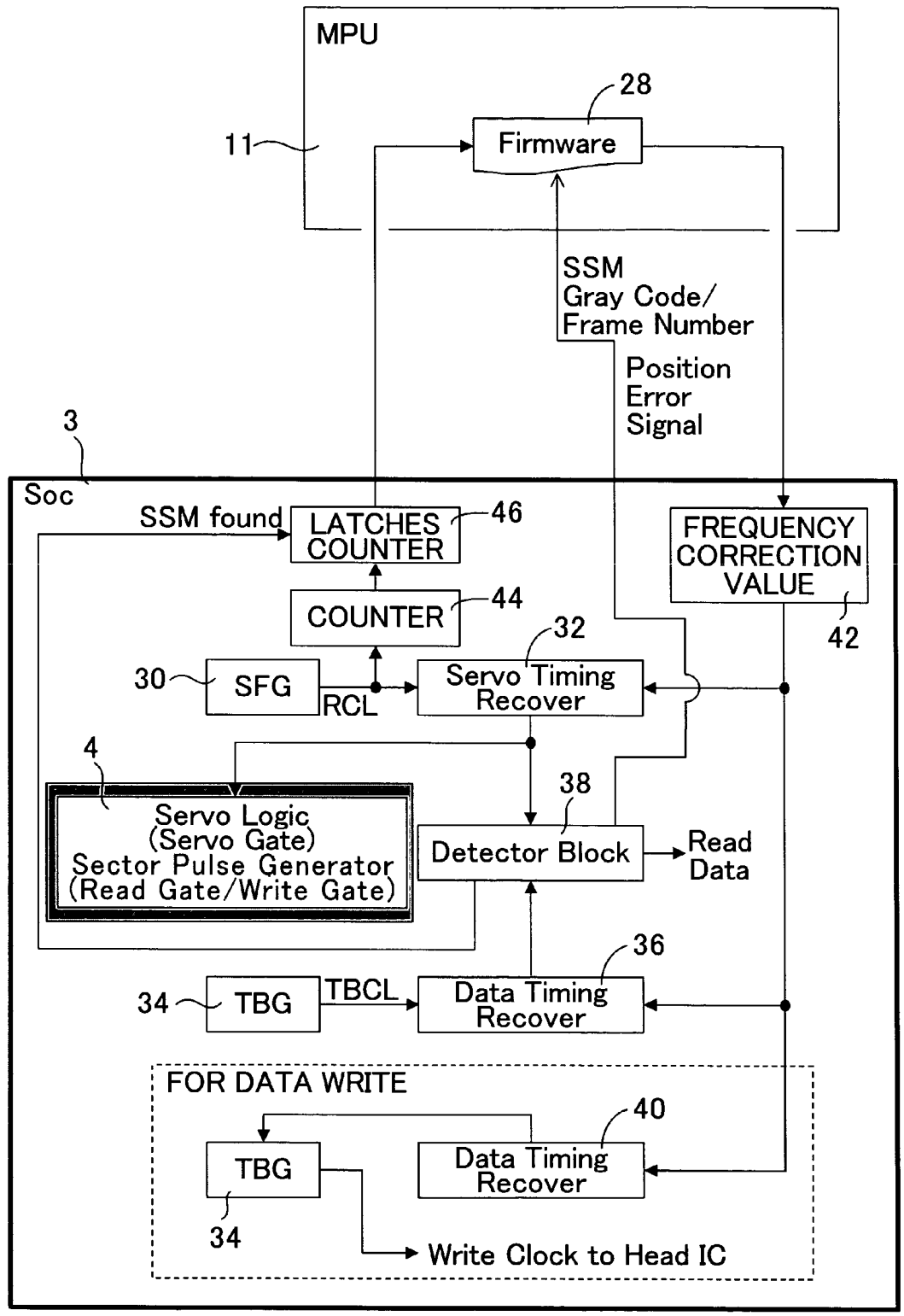
FIG. 5 is a block diagram depicting the frequency correction circuit and timing generation circuit in FIG. 1.

The MPU (Micro Processing Unit) 11 performs position control of the magnetic head 25, the read/write control and the retry control. The memory (ROM/RAM) 13 stores the data necessary for the processing of the MPU 11. In the read channel circuit 16, a read/write timing circuit 3 including the frequency correction circuit, which will be described later in FIG. 5, is installed, and in the HDC 12, a servo logic circuit 4 is installed, and the MPU 11 executes the frequency correction processing 28 linking this timing circuit 3 and the servo logic circuit 4.

FIG. 2 is a diagram depicting the relationship between the track and the data in the magnetic disk 19. In this example, eight servo areas 100 and data areas 102 are created on one track. As FIG. 2 shows, eight servo areas 100 and data areas 102 are created on one track on either the inner track 19A or the outer track 19B.

Figure 3:
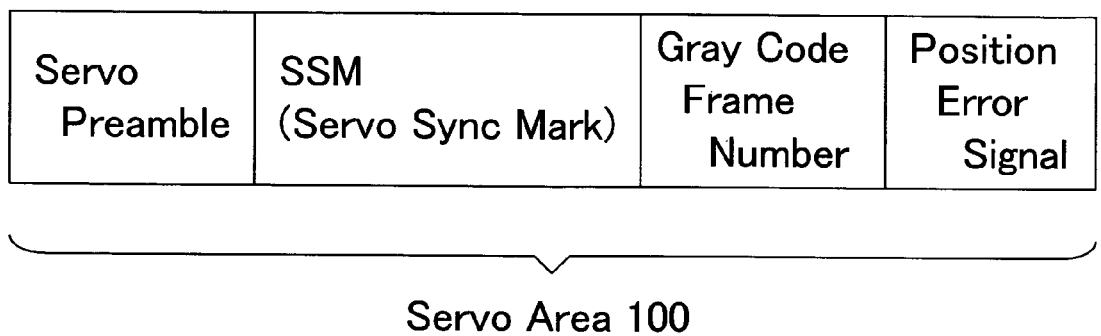
FIG. 3 is a diagram depicting the servo information in FIG. 2.

FIG. 3 is a diagram depicting the configuration of the servo area 100. The servo information to be written in the servo area 100 is comprised of a servo preamble, an SSM (Servo Synchronization Mark), a gray code (cylinder or track number), a frame number (sector number) and a position error detection signal (e.g. four phase burst signal).

Gray code indicates the cylinder number or the track number on the track, and the frame number indicates the frame or the sector number on the track. If one frame is comprised of a plurality of sectors, the frame number indicates this. The position error detection signal is normally used to detect the shift value between the track center and the head position.

Figure 4:
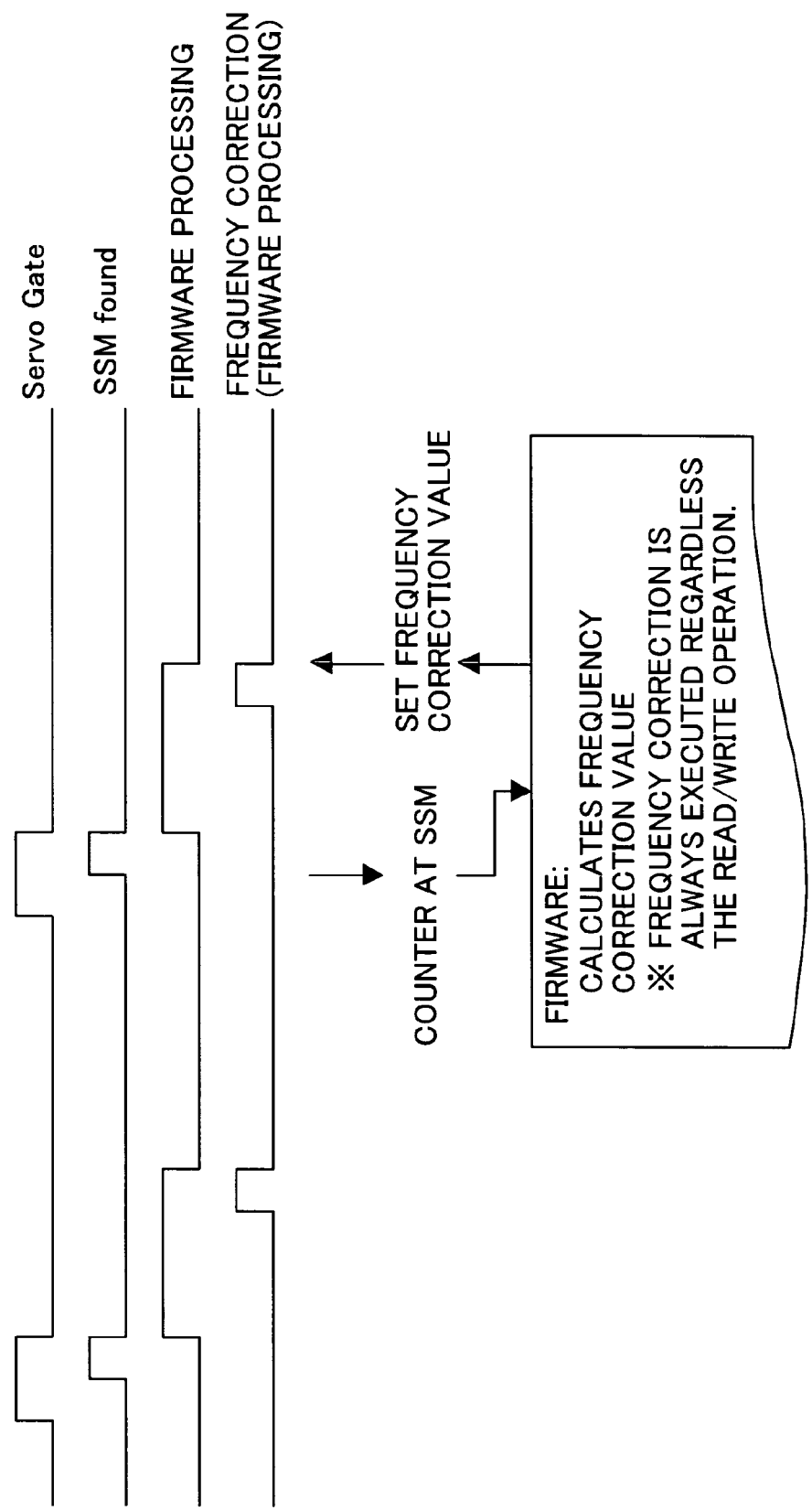
FIG. 4 is a timing chart depicting the frequency correction processing in FIG. 1.

FIG. 4 is a timing chart depicting the frequency correction processing of the configuration in FIG. 1. As FIG. 4 shows, servo information (see FIG. 3) is extracted from the read signals of the magnetic head 25 by the servo gate signals, and the servo synchronization marks SSM are detected. By this detection of the servo synchronization marks SSM, the MPU 11 executes the frequency correction processing (firmware processing) 28 which will be described in FIG. 6, calculates the frequency correction value, and sets it in the read/write timing circuit 3 of the read channel circuit 16. By this, the read/write timing circuit 3 corrects the servo gate, read gate, write gate, read clock and write clock according to the frequency correction value.

Frequency Correction Circuit

FIG. 5 is a block diagram depicting the read/write timing circuit 3 and the servo logic circuit 4 in FIG. 1. As FIG. 5 shows, the servo frequency generator (SFG) 30 generates the clock RCL of the servo reference frequency. The servo timing recover circuit 32 generates the servo timing signal, which is corrected the clock RCL of the servo reference frequency by a predetermined frequency correction value.

The time base generator (TBG) 34 generates the clock TBCL with the time base reference frequency of read/write. The data timing recover circuit 36 generates the data timing signal which is the clock with the time base reference frequency corrected by a predetermined frequency correction value. The detector block circuit 38 receives the servo timing signal and the data timing signal, detects the servo information from the read signals of the magnetic head 25, and detects the servo synchronization mark detection signal SSM found, the servo information (SSM, gray code/frame number, position error signal) and the read data.

The data timing recover circuit 40 offsets the reference frequency of the time base generator 34, and generates the write clock from the time base generator 34.

The frequency correction value register 42 holds the frequency correction value calculated by the firmware (frequency correction processing) 28 of the MPU 11, sets the correction value with respect to the reference frequency of the servo timing recover circuit 32, and sets the correction value with respect to the time base reference frequency of the data timing recover circuit 36.

The frequency correction value register 42 offsets the reference frequency of the time base generator 34 by the data timing recover circuit 40 using the correction value. The counter 44 counts the reference clock RCL of the servo frequency generator 30. The latch circuit 46 latches the count value of the counter 44 by the servo synchronization mark detection signal SSM found.

The firmware (frequency correction processing) 28 of the MPU 11 receives the servo synchronization mark from the detector block circuit 38, acquires the count value of the latch circuit 46, and performs frequency correction processing. The servo logic circuit 4 receives the servo timing signal of the servo timing recover circuit 32, and generates the servo gate, read gate, write gate and sector pulse.

The servo gate and the read gate are sent to the detector block circuit 38 for detecting the servo information, servo synchronization mark detection signal and read data. The servo gate is sent to the MPU 11 and starts up the firmware (frequency correction processing) 28, as shown in FIG. 4. The write gate and the write clock are sent to the head IC 18, and the head IC 18 drives the magnetic head 25 by the write data sent from the HDC 12.

In this way, according to this embodiment, a function for measuring the servo interval from the servo synchronization marks by the counter 44 and the latch circuit 46, a function for setting the correction value for the reference frequency RCL of the servo frequency generator 30 to the servo timing recover circuit 32 by the frequency correction value register 42, a function for correcting the timing of the servo gate, sector pulse, read gate and write gate of the servo logic circuit 4 according to the frequency correction value, a function for setting the correction value for the reference frequency of the time base generator 34 to the data timing recover circuit 36 during data read, and a function for offsetting the reference frequency of the time base generator 34 by the correction value during data write are provided.

Frequency Correction Processing

Figure 6:
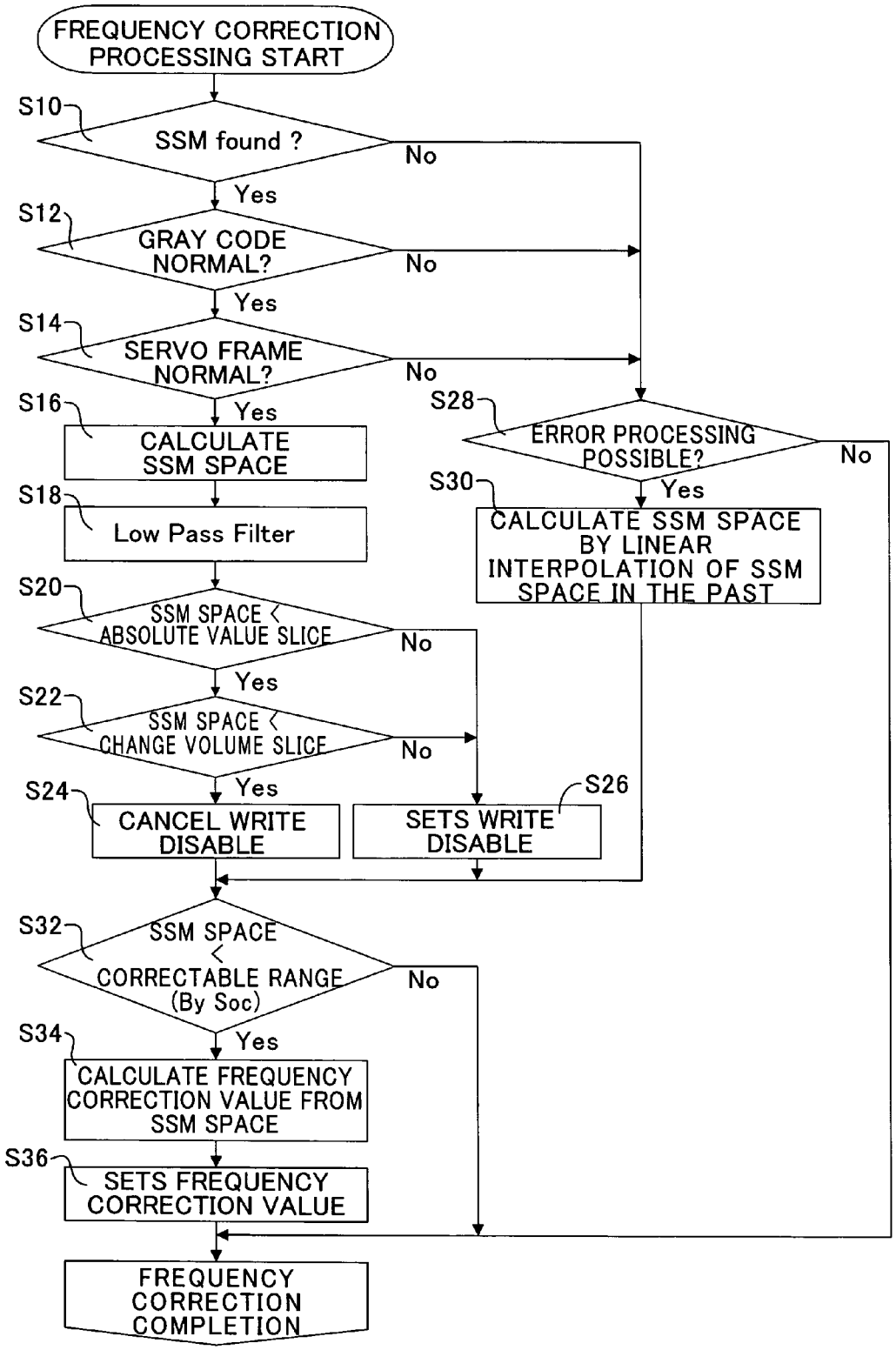
FIG. 6 is a flow chart depicting the frequency correction processing according to an embodiment of the present invention.
Figure 7:
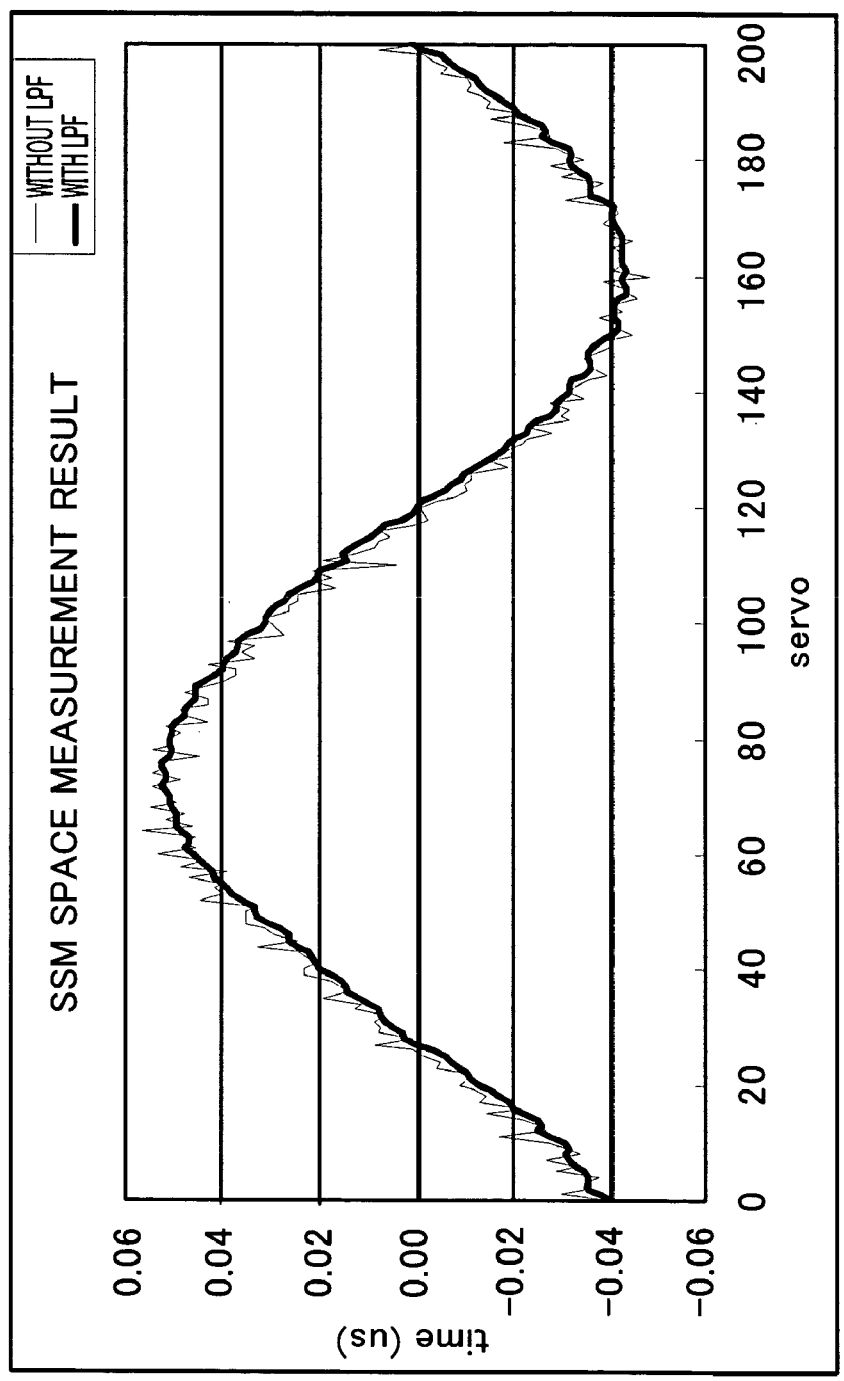
FIG. 7 is a graph depicting the low pass filter processing in FIG. 6.
Figure 8:
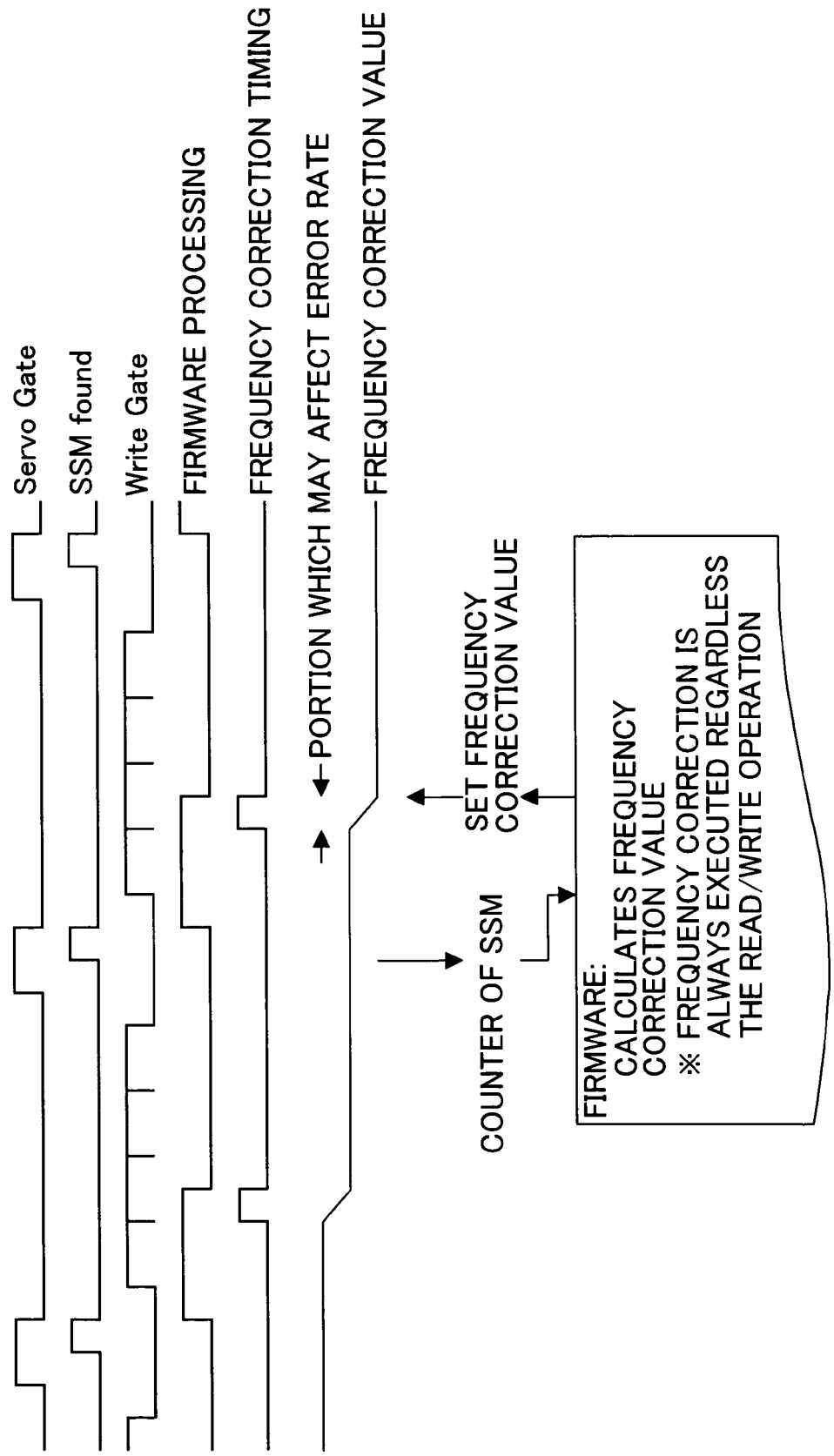
FIG. 8 is a diagram depicting the frequency limitation processing in FIG. 6.
Figure 9:
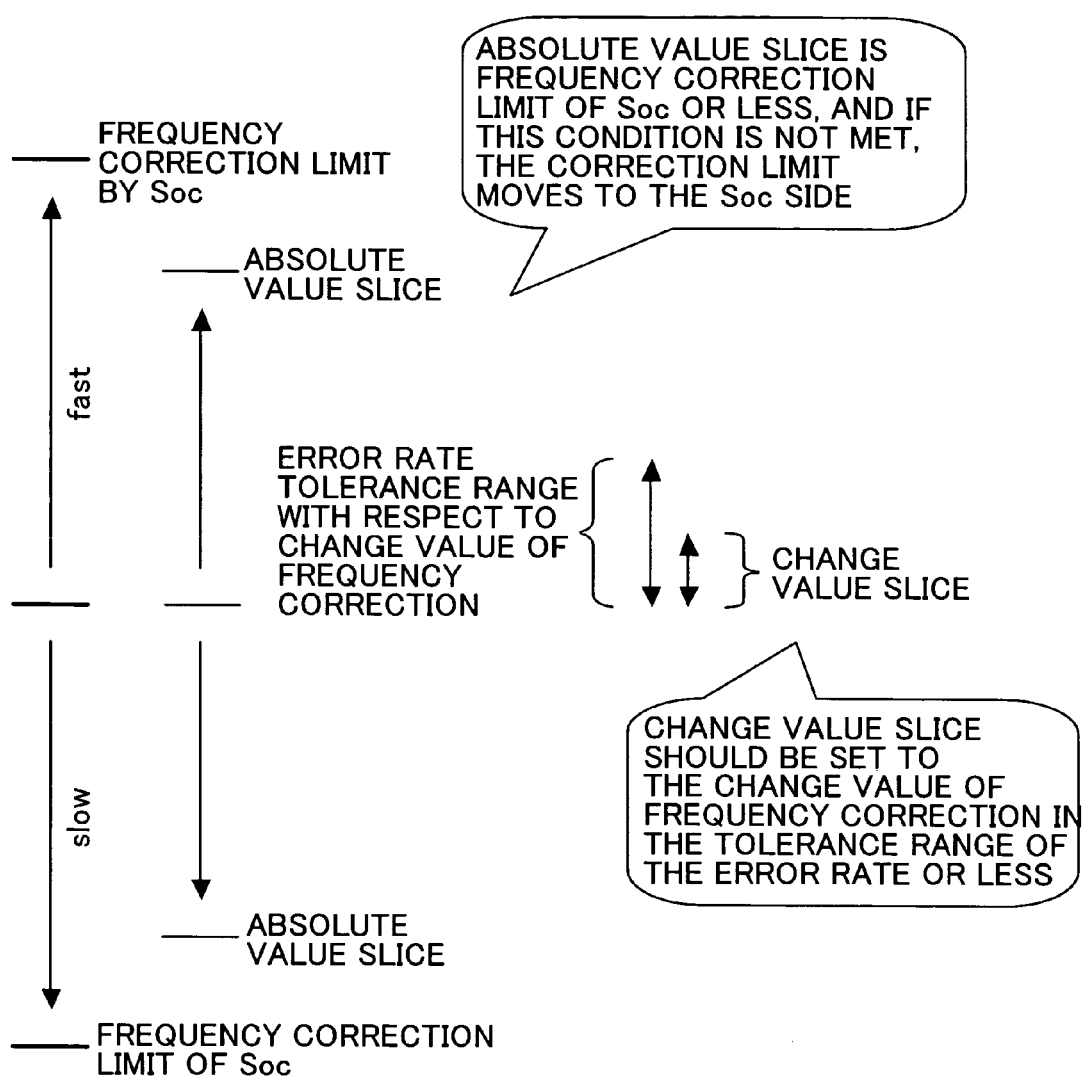
FIG. 9 is a diagram depicting the slice of the frequency limitation processing in FIG. 6.

FIG. 6 is a flow chart depicting the frequency correction processing according to an embodiment of the present invention, FIG. 7 is a graph depicting the low pass filter processing in FIG. 6, FIG. 8 is a timing chart depicting the error rate drop prevention in FIG. 6, and FIG. 9 is a diagram depicting the slice for the error rate drop prevention in FIG. 8.

The frequency correction processing in FIG. 6 will be described with reference to FIG. 7 to FIG. 9.

(S10) The MPU 11 starts the frequency correction processing at the timing of the servo gate SG in FIG. 4. First the MPU 11 judges whether the servo synchronization mark detection signal was received. At the timing of the servo gate, the MPU 11 receives the servo synchronization mark detection signal if normal, and if the servo synchronization mark detection signal is not received, the servo synchronization mark which is detected in error will be used, so to prevent this the processing moves to step S28.

(S12) When it is judged that the servo synchronization mark detection signals SSM found was received, the MPU 11 judges whether the gray code of the servo information is the expected gray code. This is also for judging that the servo synchronization mark was detected correctly, and if the gray code is not the expected gray code, the processing moves to step S28.

(S14) If it is judged that the gray code is the expected gray code, the MPU 11 judges whether the servo frame number of the servo information is the expected servo frame number. This is also for judging that the servo synchronization mark was detected correctly, and if the servo frame number is not the expected servo frame number, the processing moves to step S28.

(S16) If it is judged that the servo frame number is the expected servo frame number, the MPU 11 acquires the count value of the latch circuit 46, and subtracts the count value acquired in the last servo gate from the acquired count value to calculate the SSM interval.

(S18) The MPU 11 performs low pass filter (LPF) processing on the SSM interval measurement result. This is for suppressing measurement dispersion. For example, the measurement result this time is added to the integrated value of the measurement results up to the previous time, and the result is divided by the number of times of measurement. This is regarded as the SSM interval of this time. FIG. 7 is a graph depicting the low pass filter. The abscissa indicates the servo frame number, and the ordinate indicates the time shift of the SSM interval when the SSM interval without any rotation jitter is "0". As FIG. 7 shows, in the measurement result after low pass filter processing, indicated by a bold line, the measurement dispersion of the SSM interval is suppressed compared with the actual measurement result, indicated by the fine line. A phase lag is generated by the LPF processing, so the gap for the amount of the frequency correction error of this phase lag is created to absorb the phase lag.

(S20) Then the MPU 11 judges whether the SSM interval is smaller than the absolute value slice. As the timing chart in FIG. 8 shows, when the SSM is detected by the servo gate at each servo frame, the firmware starts up, calculates the frequency correction value, and sets the frequency correction value in real-time. By this, a more accurate frequency correction is performed, but this operation changes the frequency regardless the read/write operation of the data area, so the frequency changes in the middle of the sector.

In FIG. 8, it is possible that the frequency changes in the second sector (write gate) during the processing time of the firmware, which may affect the error rate. For example, if the large frequency change is occurred, the timing of the second write gate OFF (same as for the read gate), which is corrected by the frequency correction, becomes longer. The change of the frequency correction, which affects the error rate, should be avoided. For this, as FIG. 9 shows, the absolute value slice, which is less than the frequency correction limit of the frequency correction circuits 32, 36 and 40, is set, and it is judged whether the SSM interval is smaller than the absolute value slice. If the SSM interval is not smaller than the absolute value slice, the processing moves to the error processing in step S26.

(S22) For the same reason, the MPU 11 judges whether the change value of the SSM interval (difference between the SSM interval the previous time and the SSM interval this time) is smaller than the change value slice, which will be described later in FIG. 10. As FIG. 9 shows, the change value slice is less than the frequency correction change value with respect to the tolerance range of the error rate or less. When the change value of the SSM interval is not smaller than the change value slice as well, the processing moves to the error processing in step S26.

(S24) If the change value of the SSM interval is smaller than the change value slice, write disable is cancelled.

(S26) If the SSM interval is not smaller than the absolute value slice or if the change value of the SSM interval is not smaller than the change value slice in step S20 and S22, write disable is set as the error processing. In other words, this frame becomes write disabled hereafter.

(S28) If the SSM is not detected or if it is detected in error in step S10, S12 and S14, the error processing is executed. In this error processing, it is first judged whether error processing is possible. In other words, it is judged whether the SSM, the gray code and the servo frame number were detected normally in the previous two times. If detection was abnormal, the processing ends since interpolation processing cannot be performed accurately in the next step, S30.

(S30) If it is judged that the SSM, the gray code and the servo frame number were detected normally in the previous two times, the SSM interval this time is calculated from the SSM interval in the past (SSM interval in previous two times) by linear interpolation. And the processing moves to step S32.

(S32) Then the MPU 11 judges whether the SSM interval is smaller than the frequency correctable range (see FIG. 9) of the frequency correction circuits 32, 36 and 40. If the SSM interval is not smaller than the frequency correctable range, the processing ends since frequency correction cannot be performed.

(S34) If the SSM interval is smaller than the frequency correctable range, the MPU 11 calculates the frequency correction value from the SSM interval.

(S36) The MPU 11 sets the calculated frequency correction value in the frequency correction value register 42 in FIG. 5. By this, the frequency correction for this frame ends.

In this way, the frequency correction value is calculated from the measurement result of the SSM interval, so using the SSM interval detected in error may cause data corruption. In order to prevent this, it is judged whether the servo synchronization mark SSM was detected normally. In this example, three levels of checks are performed for safety, that is, it is judged whether the SSM detection signal exists, whether the gray code is normal, and whether the frame number is normal.

If the SSM is detected in error, the gray code and the frame number after the SSM are also demodulated to be abnormal values. Only one of the gray code and the frame number may be used to judge the normalcy. By this, the frequency correction using SSM interval detected in error can be prevented, and the danger of data corruption can be avoided.

The measurement dispersion of the SSM interval also becomes a cause of the abnormal frequency correction, and may corrupt data. Therefore the measurement result of the SSM interval is processed with a low pass filter to suppress dispersion.

Even if SSM is detected in error, frequency correction is possible since the SSM interval is estimated by linear interpolation.

Also the frequency correction value is set in each servo frame in real-time, so a more accurate frequency correction is performed, but this operation, which changes the frequency regardless the read/write operation of the data area, may change the frequency in the middle of the sector, and may affect the error rate if the frequency change is large.

To prevent this, it is judged whether the SSM interval is within the frequency correction with an allowable error rate. Here it is judged whether the SSM interval is within the frequency range using the absolute value slice and the change value slice. If the SSM interval is not within a frequency correction with an allowable error rate, write in the frame is disabled to prevent affecting the error rate.

Then it is judged whether the SSM interval is within the correctable range of the frequency correction circuit, and if it is not in the correctable range, the calculation and setting of the frequency correction values are not executed to prevent setting an abnormal correction value in the frequency correction circuit. Even when writing is disabled, if the SSM interval is within the correctable range of the frequency correction circuit, the measurement result is reflected for the next judgment of the frequency correction value, so the frequency correction value is calculated and set.

By applying the DSW method, theoretically the rotation jitter gap can be deleted, but if the above mentioned phase lag of the low pass filter processing, the linear interpolation correction error and the calculation error of the frequency correction value by the firmware processing are considered, it is not desirable to delete whole the gap, and it is only possible to decrease to $\frac{1}{3}$-$\frac{1}{5}$ gap length of the gap when the DSW method is not used.

Frequency Correction Limitation Processing

Now how to set the absolute value slice and the change value slice for the above mentioned frequency correction limitation will be described.

Figure 10:
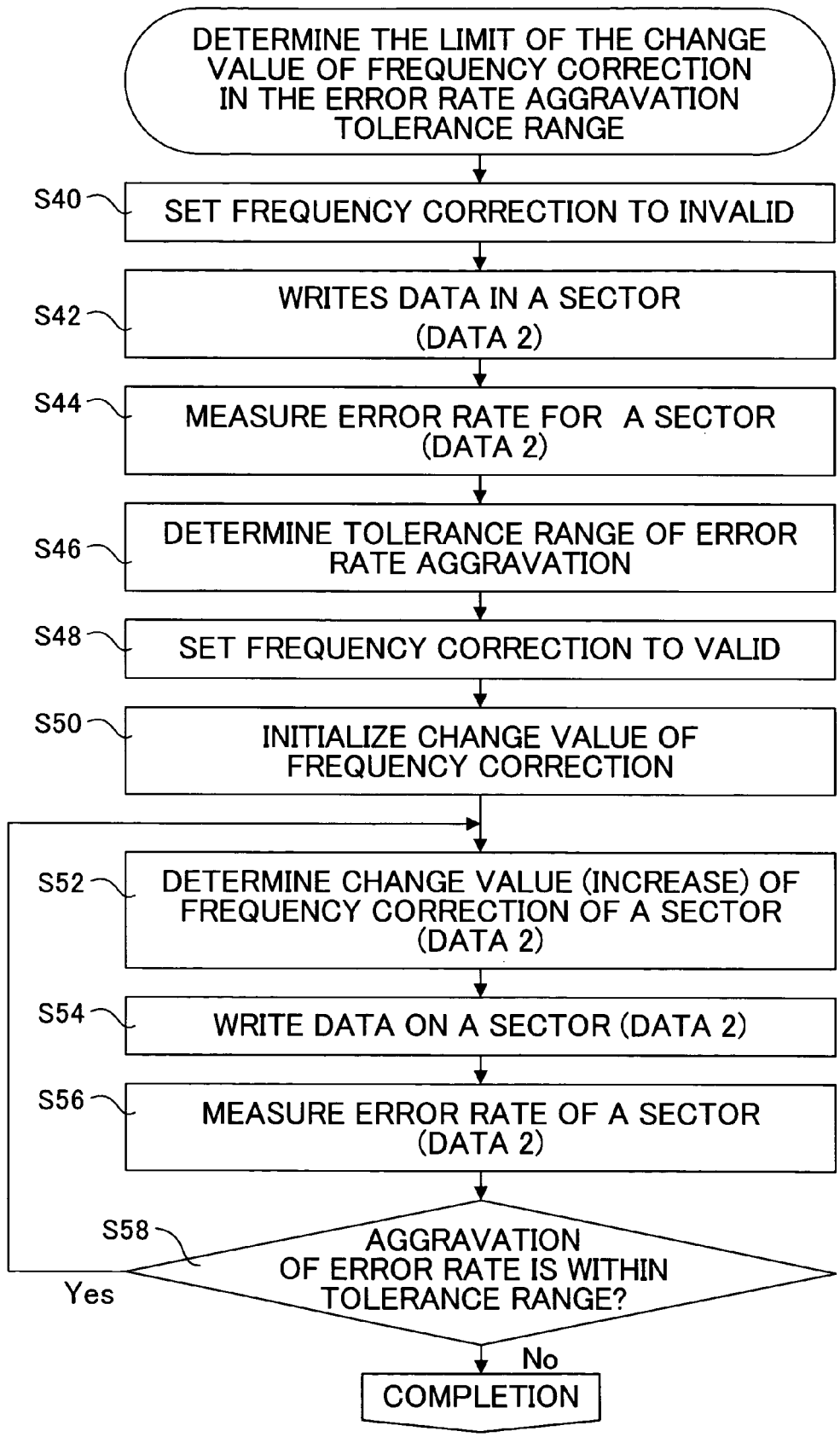
FIG. 10 is a flow chart depicting the change value slice measurement processing in FIG. 9.
Figure 11:
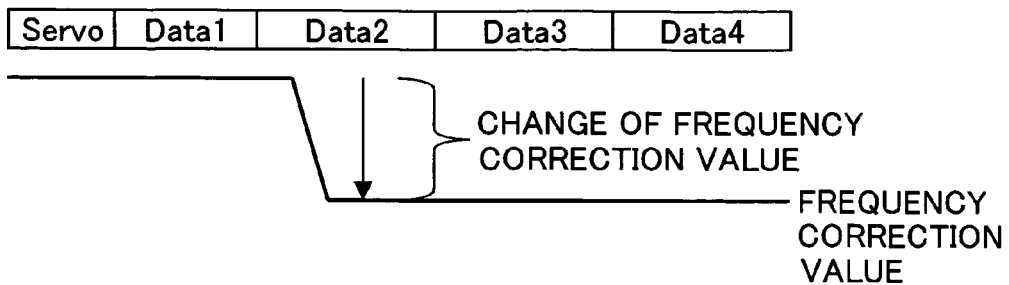
FIG. 11 is a diagram depicting the change value slice measurement operation in FIG. 10.

FIG. 10 is a flow chart depicting the change value slice measurement processing in FIG. 6, and FIG. 11 is a diagram depicting the operation thereof. This processing is measured using a typical drive, and the change value slice of the measurement result is used for other drives.

(S40) First in the configuration in FIG. 1, the frequency correction processing is disabled. In other words, measurement is started without the frequency correction.

(S42) Data is written to a sector (Data 2 in FIG. 11).

(S44) Data written on the sector is read, and the error rate is measured. In other words, the data is read a plurality of times and the error rate is measured.

(S46) Since the error rate during normal operation is known from the measurement result when the frequency correction is not executed, the tolerance range, in which the error rate is not aggravated even if the frequency correction is executed, is determined based on this measurement result.

(S48) Then in the configuration in FIG. 1, the frequency correction processing is enabled. In other words, the frequency correction is executed and the measurement is performed.

(S50) The change value of the frequency correction is initialized.

(S52) The frequency correction value (change value of the frequency correction) of a sector is increased and is set in the frequency correction value register 42 in FIG. 5.

(S54) In a state where the frequency correction circuit of the read/write timing circuit 3 is corrected with this frequency correction value, data is written on a sector (Data 2).

(S56) Data written on a sector is read and the error rate is measured. In other words, the data is read a plurality of times and the error rate is measured.

(S58) It is judged whether this error rate is in a tolerance range in which the error rate determined in step S46 is not aggravated. If the error rate is in the tolerance range, the processing returns to step S52, and the frequency correction value to be set is increased. If the error rate is not in the tolerance range, the frequency correction value determined in step S52 is used, and from this, the change value slice of the change value of the SSM interval, shown in FIG. 6 and FIG. 9, is determined.

Figure 12:
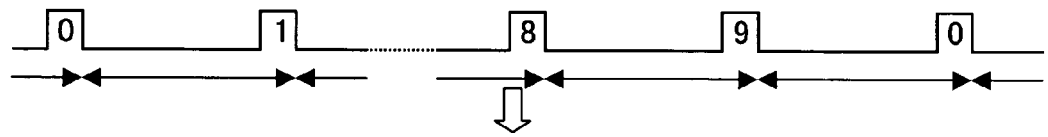
FIG. 12 is a diagram depicting the write linking for determining the absolute value slice in FIG. 9.
Figure 12:
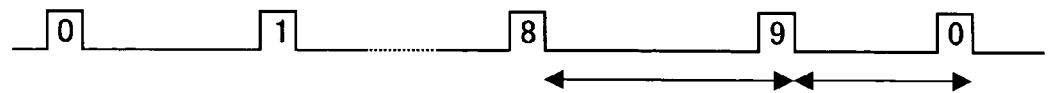
Figure 13:
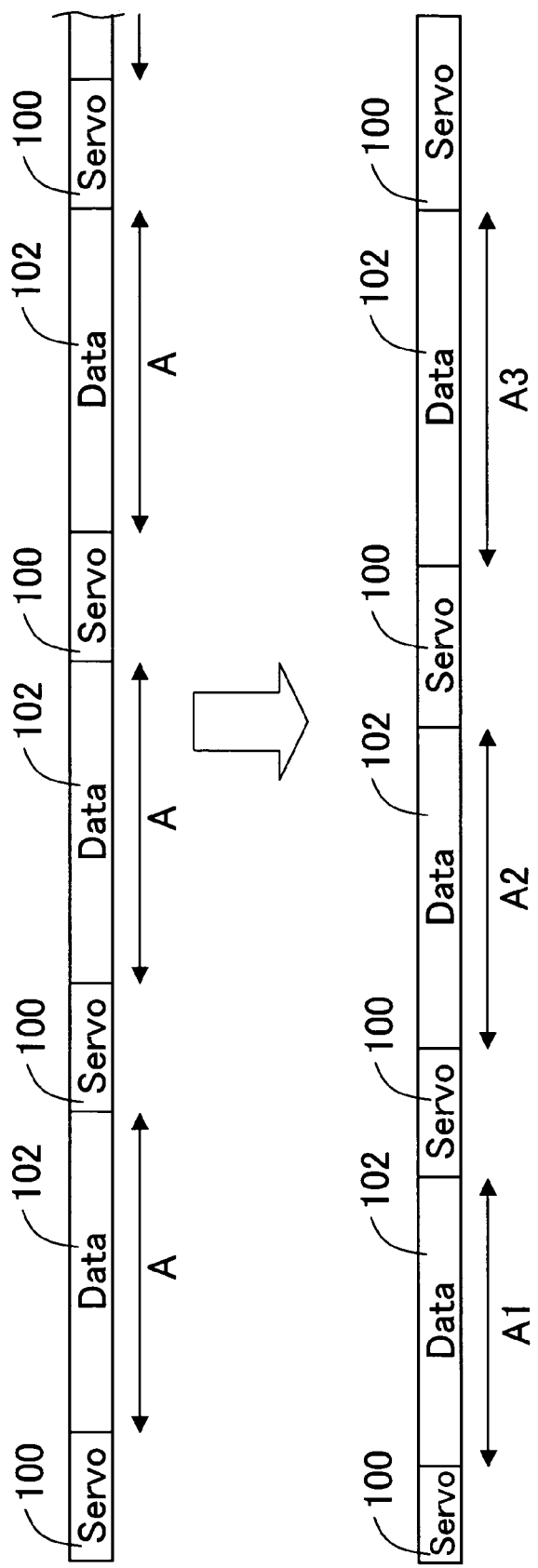
FIG. 13 is a diagram depicting the servo interval by a conventional rotation jitter.
Figure 14:
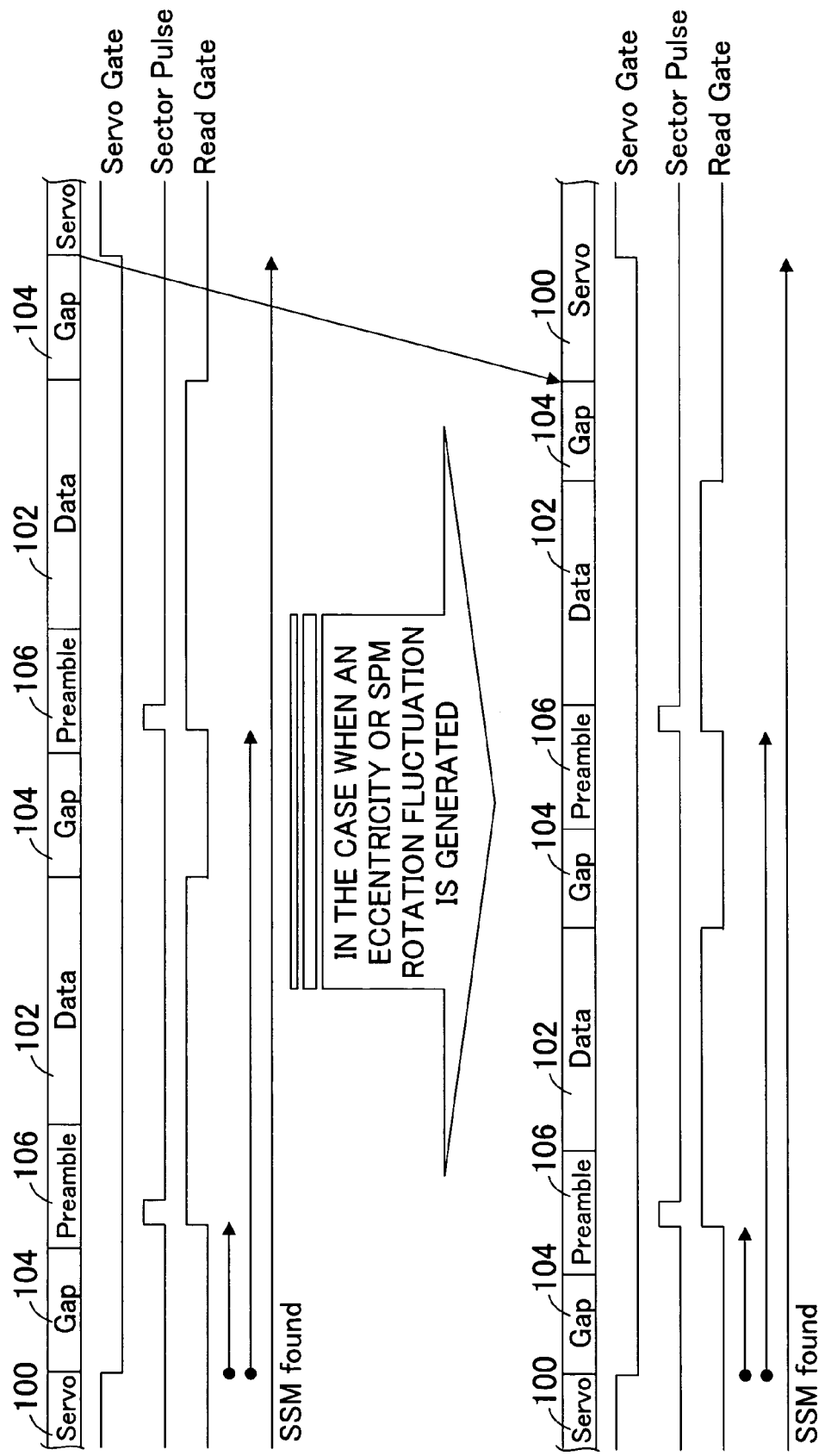
FIG. 14 is a diagram depicting the rotation jitter absorption operation by a conventional gap.
Figure 15:
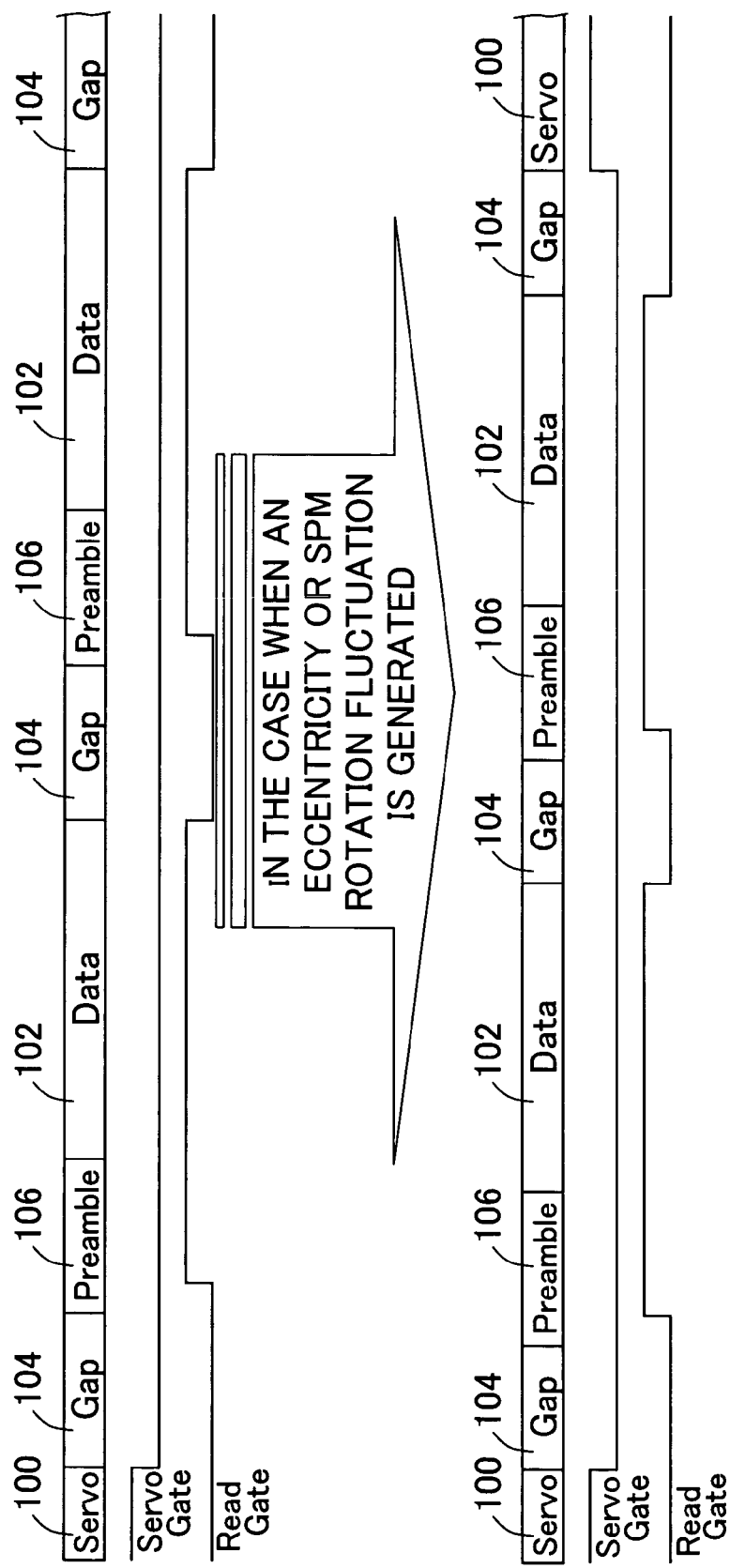
FIG. 15 is a diagram depicting the rotation jitter absorption operation by a conventional DSW method.

Now how to determine the specific absolute value slice and the change value slice will be described. FIG. 12 is a diagram depicting the write linking of write start and write end when the servo information is written on the magnetic disk 19.

The absolute value slice is the maximum value at which the total of the following items are frequency-corrected, and this maximum value is regarded as the slice: (1) the frequency correction value for correcting the maximum time deviation by the expected maximum eccentricity which is generated by the shift of the medium, for example; (2) the frequency correction value for correcting the maximum error of the write linking of write start and write end when the servo information is written on the magnetic disk 19, which is described later in FIG. 12; and (3) the frequency correction value for correcting the maximum change time of the time deviation generated in the rotational fluctuation of the spindle motor.

As the top in FIG. 12 shows, one cycle of the magnetic disk is divided into frames "0"-"9" (servo information), then one cycle ends at frame "9" where frame "0" starts, so as the bottom in FIG. 12 shows, the write end frame "9" is limited to the write link value because of the presence of frame "0", due to the accumulation of clock errors from write start. Therefore this write link value is more or less than the ideal value. This is added to the above mentioned maximum value of the frequency correction.

Then the change value slice is determined in the above mentioned tolerance range of the error rate, which can be automatically determined by the process flow in FIG. 10.

Other Embodiments

In the above embodiments, a magnetic disk device was used to described the medium storage device, but the present invention can be applied to storage devices using an optical disk, magneto-optical disk and other rotary type storage medium. The interface is not limited to ATA, but other interfaces may be used. If it is expected that the change value is small, then steps S20-S26 in FIG. 6 may be omitted.

The present invention was described using embodiments, but the present invention can be modified in various ways within the scope of the essential character of the present invention, and these shall not be excluded from the scope of the present invention.

When the frequency correction value is calculated from the measurement result of the servo synchronization mark interval of the storage medium, it is judged whether the servo synchronization marks were correctly detected, so changing the synchronization timing using the SSM interval detected in error can be prevented, and a danger of data corruption can be avoided, therefore the present invention contributes to improving the reliability of a rotary type medium storage device to which the DSW method is applied.

What is claimed is:

1. A medium storage device comprising:
   a head for either reading or writing data on a track of a storage medium where servo information, including servo synchronization marks, is written on one track with a predetermined interval;
   an actuator for positioning said head on a desired track of said storage medium which is rotating;
   a controller for controlling reading or writing data on said storage medium by said head at a timing synchronizing the rotation of said storage medium; and
   a processing unit for correcting the synchronization timing of said controller from an interval of said servo synchronization marks detected by said controller,
   wherein said processing unit judges the normalcy of the detection of said servo synchronization marks, calculates said interval of the servo synchronization marks if the judgment result is normal, and corrects a frequency of the synchronization timing of said controller based on said calculated interval,
   and wherein, if said judgment result is not normal, said processing unit calculates a space of said servo synchronization marks which is estimated by interpolation processing of the space of said servo synchronization marks in the past, and corrects the frequency of the synchronization timing of said controller based on said estimated servo synchronization marks.

2. The medium storage device according to claim 1, wherein said processing unit judges the normalcy of the detection of said servo synchronization marks based on the servo information other than said servo synchronization mark, which comes after said servo synchronization mark.

3. The medium storage device according to claim 1, wherein, if said judgment result is normal, said processing unit performs low pass filter processing for the interval of said servo synchronization marks and corrects the synchronization timing of said controller based on the interval of said servo synchronization marks of the processing result.

4. The medium storage device according to claim 1, wherein said controller comprises:
   a clock source for generating clocks; and
   a timing generation circuit for generating the rotation synchronization timing signals from said clock,
   and wherein said processing unit calculates a frequency correction value of said clock of said timing generation circuit, and sets the calculated value in said controller.

5. The medium storage device according to claim 1, wherein said processing unit starts said synchronization timing correction processing according to a servo gate signal synchronizing the rotation of said storage medium.

6. The medium storage device according to claim 4, wherein said controller further comprises a counter for counting the servo synchronization mark detection time based on the clock of said clock source,
   and said processing unit reads a count value of said counter according to a servo gate signal synchronizing the rotation of said storage medium, and executes said synchronization timing correction processing.

7. The medium storage device according to claim 4, wherein the timing generation circuit of said controller comprises:
   a servo timing generation circuit for generating a servo timing signal from said clock;
   a data timing generation circuit for generating a data timing signal from said clock; and
   a write timing generation circuit for generating a write timing signal from said clock.

8. The medium storage device according to claim 7, wherein said controller further comprises a gate signal generation circuit for generating a servo gate signal, a read gate signal and a write gate signal according to said servo timing signal of said servo timing generation circuit.

9. The medium storage device according to claim 7, wherein said controller further comprises a detection circuit for outputting said servo information and read data from a read signal of said head according to said servo timing signal and said data timing signal.

10. A medium rotation synchronization processing method for a medium storage device comprising the steps of:
    writing or reading data on a track of a storage medium where servo information, including servo synchronization marks, is written on one track with a predetermined interval at a timing synchronizing the rotation of said storage medium with a head;
    judging the normalcy of detection of said servo synchronization marks detected from a read signal of said head;
    calculating said interval of the servo synchronization marks if the judgment result is normal; and
    correcting a frequency of said synchronization timing based on the interval of said servo synchronization marks if the judgment result is normal; and
    calculating a space of said servo synchronization marks which is estimated by interpolation processing of the space of said servo synchronization marks in the past if said judgment result is not normal, and correcting a frequency of the synchronization timing of said controller based on said estimated servo synchronization marks.

11. The medium rotation synchronization processing method for a medium storage device according to claim 10, wherein said judgment step comprises a step of judging the normalcy of the detection of said servo synchronization marks based on the servo information other than said servo synchronization mark which comes after said servo synchronization mark.

12. The medium rotation synchronization processing method for a medium storage device according to claim 10, wherein said correction step comprises:
    a step of performing low pass filter processing for the interval of said servo synchronization marks if said judgment result is normal; and
    a step of correcting the synchronization timing of said controller based on the interval of said servo synchronization marks of said processing result.

13. The medium rotation synchronization processing method for a medium storage device according to claim 10, wherein said correction step further comprises a step of calculating a frequency correction value of a clock of a timing generation circuit for generating the rotation synchronization timing signal from said clock from a clock source.

14. The medium rotation synchronization processing method for a medium storage device according to claim 10, wherein said normalcy judgment step further comprises a step of judging the normalcy of said servo synchronization mark detection according to the servo gate signal synchronizing the rotation of said storage medium.

15. The medium rotation synchronization processing method for a medium storage device according to claim 13, wherein said correction step further comprises a step of executing said synchronization timing correction processing by reading a count value of a counter for counting the servo synchronization mark detection time based on the clock of said clock source according to the servo gate signal synchronizing the rotation of said storage medium.

16. The medium rotation synchronization processing method for a medium storage device according to claim 13, wherein said correction step further comprises a step of performing frequency correction of said clock of a servo timing generation circuit for generating a servo timing signal from said clock, a data timing generation circuit for generating a data timing signal from said clock, and a write timing generation circuit for generating a write timing signal from said clock.

17. The medium rotation synchronization processing method for a medium storage device according to claim 16, further comprising a step of generating a servo gate signal a read gate signal and a write gate signal according to said servo timing signal of said servo timing generation circuit.

18. The medium rotation synchronization processing method for a medium storage device according to claim 16, further comprising a step of detecting said servo information and read data from the read signal of said head according to said servo timing signal and said data timing signal.

* * * * *

UNITED STATES PATENT AND TRADEMARK OFFICE
CERTIFICATE OF CORRECTION

PATENT NO. : 7,522,363 B2  Page 1 of 1
APPLICATION NO. : 11/182481
DATED : April 21, 2009
INVENTOR(S) : Abe et al.

It is certified that error appears in the above-identified patent and that said Letters Patent is hereby corrected as shown below:

Col. 12, line 44, delete "ofjudging" and insert -- of judging --.

Signed and Sealed this

First Day of September, 2009

David J. Kappos
*Director of the United States Patent and Trademark Office*